Figure 1:
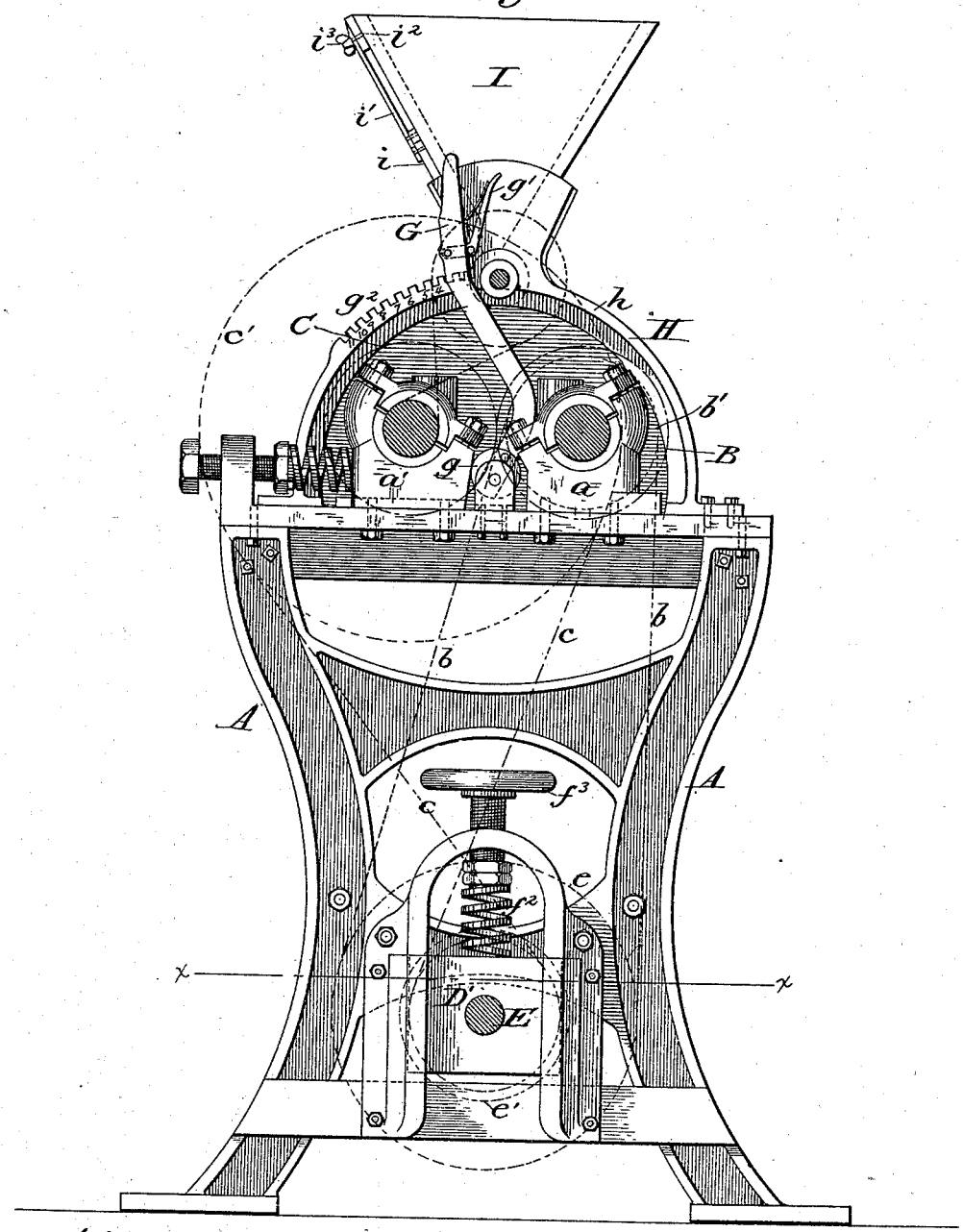

(No Model.) 5 Sheets—Sheet 3.

J. STEVENS.
GRINDING MILL.

No. 268,567. Patented Dec. 5, 1882.

Attest.
Sidney P. Hollingsworth
Danl. Kelly,

Inventor
John Stevens
By Rencwisen & Rencwison
Attys.

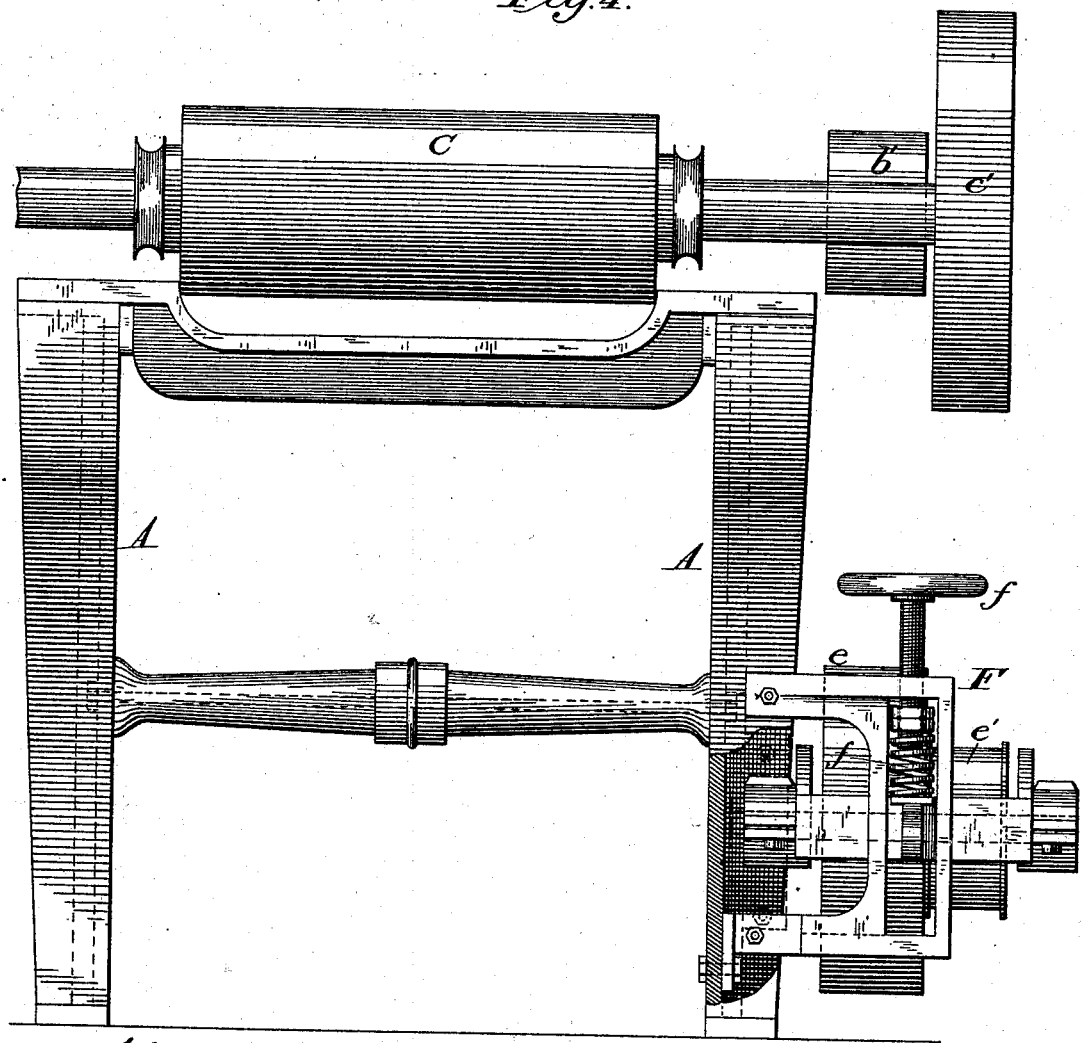

(No Model.)
5 Sheets—Sheet 5.
J. STEVENS.
GRINDING MILL.
No. 268,567.  Patented Dec. 5, 1882.
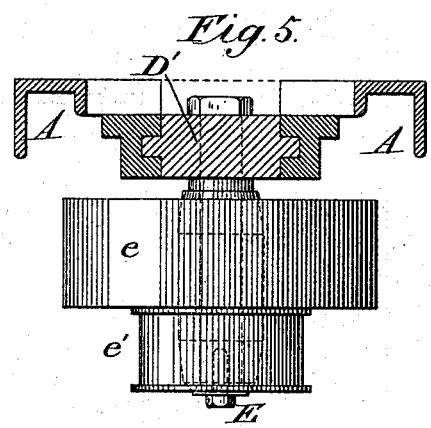
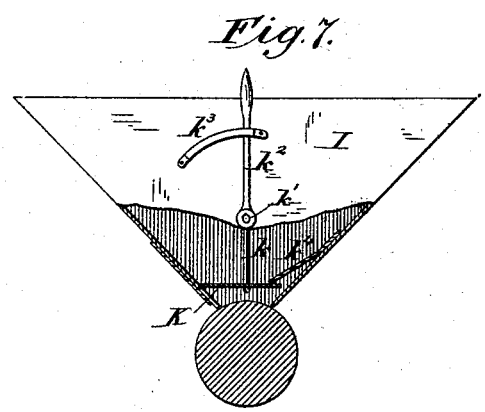
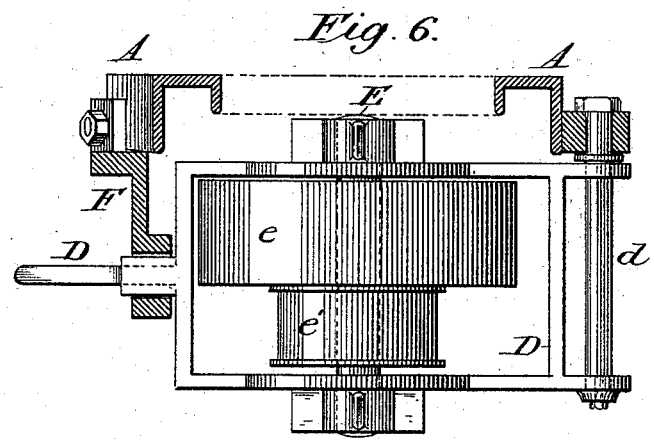
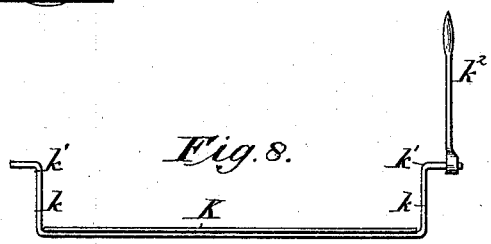
Attest.
Sidney P. Hollingsworth.
Danl Kelly.
Inventor:
John Stevens
By Pomerine & Pomerine
Attys.

UNITED STATES PATENT OFFICE.

JOHN STEVENS, OF NEENAH, WISCONSIN.

GRINDING-MILL.

SPECIFICATION forming part of Letters Patent No. 268,567, dated December 5, 1882.

Application filed December 13, 1881. (No model.)

*To all whom it may concern:*

Be it known that I, JOHN STEVENS, of Neenah, in the county of Winnebago and State of Wisconsin, have invented certain new and useful Improvements in Grinding-Mills, of which the following is a specification.

My invention relates to that class of grinding-mills known as "roller-mills," more especially to such as have their rolls driven at differential speeds, whether single or double mills; and it consists in improved means whereby the rolls may be driven by belting; in the combination, with pulleys on the ends of the rolls, one of which is driven, of a spring-pressed movable carrier located at a distance therefrom, and provided with a transmitting pulley or pulleys, a belt connecting the pulley on the driven roll with the pulley on the carrier, and another belt connecting the pulley on the carrier with the pulley on the second roll; in the combination, with differentially-moving rolls, of a large pulley on the shaft of one, a small pulley on the shaft of the other, a movable spring-pressed yoke carrying a large and a small pulley, a belt connecting the large pulley on the roll with the small pulley on the yoke, and a belt connecting the small pulley on the roll with the large pulley on the yoke, whereby the slack of each belt will be taken up and the rolls both driven without slip; in the combination, with the spring-pressed sliding bearings of the movable roll and the fixed bearings of the stationary roll, of a cam between the movable and fixed bearings, against which the former is held by its spring, a lever connected with said cam, and a rack upon the frame into which said lever latches; in the combination, with the movable and stationary rolls, of a dome-shaped casing covering them, a cam against which the movable bearing is pressed by a spring and pivoted substantially concentric with said casing, a rack formed upon and partaking of the outline of the metal side frame of the casing, and a lever fixed to the cam and latching into said rack; in the combination, with the hopper-gate, of devices at each end for its adjustment, and an indicator for each of said devices to insure its parallelism; in the combination, with a sliding hopper-gate, of elbow-levers, to which it is hung at each end, a segmentally-slotted plate fast to the body of the hopper, underlying the long arm of each lever, a set-screw taking from said arm into the slot in said plate to clamp the arm in any determined adjustment, and a scale upon each plate, similarly graduated to indicate the adjustment of the gate at each end; in the combination, with the hopper and its adjustable gate, of a cut-off plate suspended near the bottom of the hopper by means of arms depending from overhead pivots, a lever rigid with one of said pivots, and its arm, whereby the cut-off may be swung forward against the side of the hopper or its gate to close the exit-orifice, and a shield or apron at the other side of the hopper, resting against the adjacent edge of the cut-off, and beneath which said cut-off may be carried, when swung in a reverse direction, to again open the exit-orifice; and in the various other combinations and details of construction hereinafter described and claimed.

Figure 2:
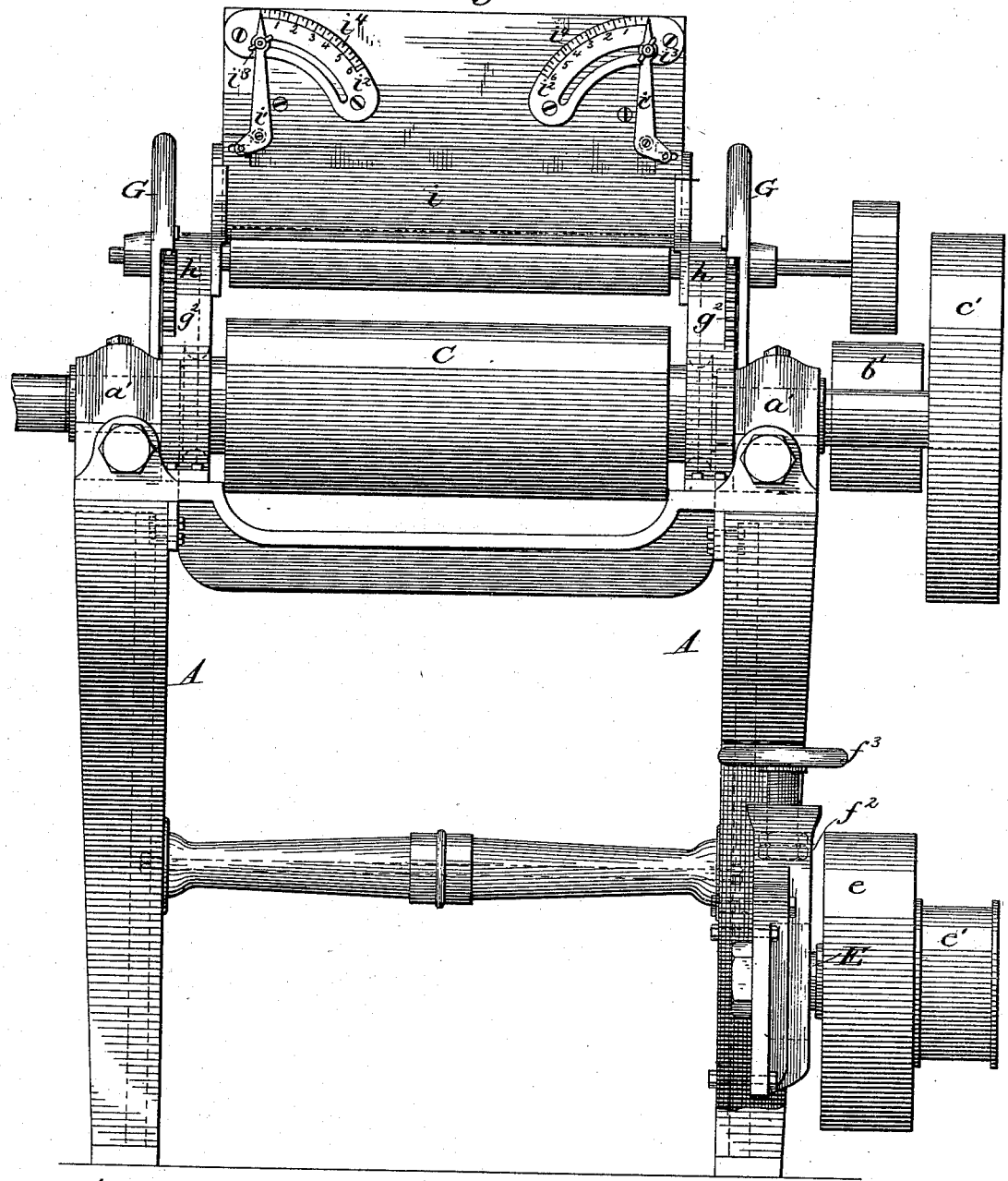
Figure 3:
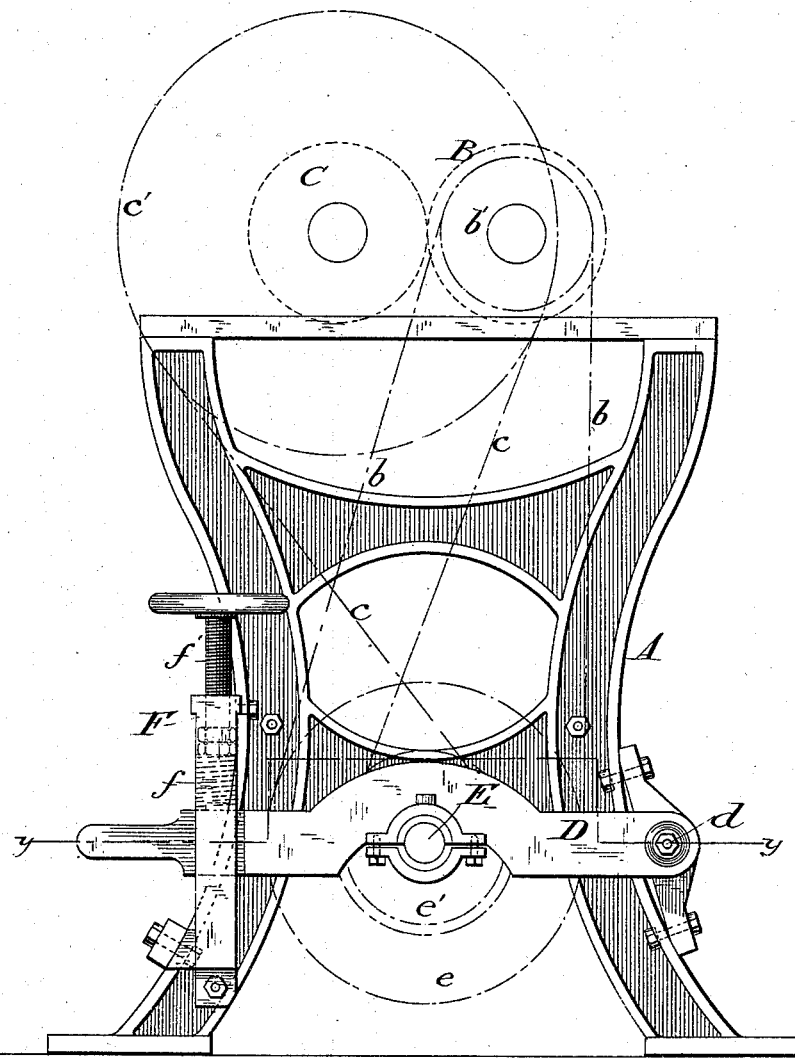

In the drawings, Figure 1 is a side elevation of a roller-mill embodying the features of my invention. Fig. 2 is a front view of the same, with casing omitted to show more clearly the arrangement of parts. Fig. 3 is a side elevation of the lower part of a roller-mill frame, showing an embodiment of certain features of said invention in their preferred form. Fig. 4 is a front view of the last-mentioned frame and the parts carried thereby; Fig. 5, a cross-section on the line $x\ x$ of Fig. 1; Fig. 6, a cross-section on the line $y\ y$ of Fig. 3; Fig. 7, a side elevation of the hopper, with parts broken away to expose the cut-off; and Fig. 8, a detached front view of said cut-off, its supporting arms and lever.

The arrangement of rolls in a rolling-mill is such that were those of a pair directly connected by a belt the major axis of the latter would ordinarily not have a length of over three feet. It is well known that such short belts have heretofore proven utterly unreliable, it being practically impossible to prevent them from slipping if any work is put upon the rolls. Hence it has been a desideratum to use a long belt, if any is used, and the advantages of driving by belting instead of by toothed gearing are so marked in this class of machines that resort has been had to various expedients to accomplish this end, in all of which, so far as I am aware, belts of great length and corresponding cost have been employed—in fact, continuations of the main belt by means of an arrangement of idlers over the roller-pulleys. My purpose is to employ belts of such moderate length as to be confined to the mill-frame, but at the same time of sufficient length as to enable me by means hereinbelow described to overcome their tendency to slip.

A is the main or supporting frame of the mill, carrying suitable boxes or bearings, $a\ a'$, in which are mounted rolls B and C, the former of which is the swift roll running in fixed bearings, and is driven by a main belt from the mill-shafting through a pulley upon one end of its shaft. The bearings of the slow roll C are yielding or adjustable, as customary.

At a point, $d$, low down upon the legs or any other suitable part of the supporting-frame, I hinge or pivot a yoke, D, in which is mounted, near its center, a short shaft or spindle, E, having one large pulley, $e$, and one small pulley, $e'$, both pulleys being keyed fast. The free end of the yoke moves in and is steadied by a guide-way in a bracket, F, and is pressed down by a strong spring, $f$, the stress of which is made adjustable by means of a screw, $f'$, provided with a hand-wheel or cross-head for easy control. The guideway may, however, be dispensed with by lengthening the end of the screw, so that it shall pass between the coils of the spring and through a hole in the end of the yoke; or, if the pivot of the latter is of sufficient length to independently steady it, neither provision may be found necessary. A belt, $b$, is led directly from a small pulley, $b'$, on the end of the shaft of the driven roll to the large pulley supported in the yoke, so as to drive it at reduced speed. Another belt, $c$, is thrown over the small pulley of the yoke and a large pulley, $c'$, on the shaft of the slow roll, thereby causing the latter to be driven with another reduction of speed from the yoke-shaft, and intermediately from the driven roll. In the drawings this latter belt is shown as crossed, in order that the rolls may turn toward each other; but if they are to both move in the same direction it is evident that it will be straight. The yoke, being spring-pressed, carries its pulleys down against the belts with a force determined by the adjustment of the screw, and takes up all slack, keeping both belts constantly in biting contact with their pulleys, so that the exponent of lost motion or slip is reduced to a minimum. This yoke may also be beneficially used with pulleys of equal diameters where both rolls are to be driven at the same speed.

Instead of the pivoted yoke to support the tightening and transmitting pulleys, I may use a block sliding in vertical ways, as represented in Figs. 1 and 5, and likewise pressed down by a spring and adjusting-screw, D' being the block carrying spindle E, with large and small pulleys, $f^2$ the spring, and $f^3$ the screw set in a lug or bridge above the ways. This is to be distinguished from a mere tightener—such as frequently found in roller-mills—mounted in a similar manner, but serving only to keep a belt tense, not also to transmit motion to and slow down the speed of one roller compared with the other.

Upon each side of the frame, between the movable and stationary boxes, I pivot cams or eccentrics $g$, against which the movable boxes are normally pressed by their springs, thus bringing the roll which they carry up toward the opposite roll to an extent determined by the adjustment of said eccentrics. Fast to the eccentrics are levers G, having hand-pieces $g'$, which control dogs taking into racks $g^2$ in the frame to hold the levers and eccentrics in any given adjustment.

I prefer to construct the upper casing or housing, H, of the rolls of dome shape, forming its metal side frame-pieces, $h$, upon an arc substantially concentric with the pivot of the eccentrics. This permits me to cast the racks $g^2$ as parts of said frame-pieces, partaking of their contour, and being at the same time brought thereby into proper relation for the engagement of the lever at any point. Each rack will have suitable graduating marks or numbers, the marks on one corresponding with those on the other, so that the levers at both ends may readily be placed at the same adjustments.

The discharge-orifice of the feed-hopper I is provided with a gate, $i$, which slides up and down in ways to adjust the effective size of the orifice. At each end the gate is hung upon an elbow-lever, $i'$, pivoted to the body of the hopper. The long arm of each lever terminates in a pointer, and overlies a plate, $i^2$, which is fixed to the hopper-casing and slotted on an arc concentric with the lever-pivot. A clamp-screw, $i^3$, takes from the lever-arm into the segmental slot to lock the former in any given adjustment, and similarly numbered or graduated scales $i^4$ upon each plate beneath and in the path traveled by the pointers indicate the adjustment at each end and enable the attendant to make it accurately the same. This construction permits the gate to be opened at either end independently of the other, and to be quickly reset to a co-ordinate adjustment. Thus any foreign substance in the grist lying near one end of the hopper may be removed by opening the gate at that end alone, instead of opening it bodily along its whole length, and the momentary increase in discharge of material will be reduced to a minimum.

Heretofore, when from any reason it has been necessary to suddenly shut off material from the grinding instrumentalities, this has been done by closing the gate of the hopper, thus breaking up its adjustment, which may have been very nicely calculated, and necessitating a new adjustment before the mill can be again started. To avoid this I apply an independent cut-off to the hopper, so that the flow of grain or material to the rolls or grinding-surfaces may at any moment be instantaneously stopped without disturbing the gate. Said cut-off consists of a horizontal plate, $k$, suspended along the bottom of the hopper, just above the feed-roll, by means of arms K at each end depending from and rigid with overhead pivots $k'$, journaled in the end boards of the hopper. A lever, $k^2$, is keyed to one of these pivots outside the hopper and provided with a suitable rack, $k^3$, to hold it in position. By manipulating this lever the cut-off plate may be swung forward and locked against the side of the hopper or its gate, immediately above the exit-orifice to close the latter. In this movement, were there no compensating provision, the cut-off plate would open a space at the rear of the hopper equal to that which it closed at the front. Therefore a shield or apron, $k^4$, is attached to the back board of the hopper and carried down and given such breadth that when the cut-off is closed its free end will just rest upon the rear edge of the cut-off plate, thus bridging the space left by the latter. When the cut-off is swung in a reverse direction to open the exit-orifice and start the feed it will be carried up out of the way beneath the shield or apron, and there be held by the locking of its lever into the rack. While this mode of constructing the cut-off is the one I prefer, since it cuts the material off from contact with the feed-roll, as well as from access to the discharge-orifice, it is evident that it might assume the form of a gate controlled independently of the feed-gate—as, for instance, the feed-gate $i$ is herein shown as sliding in ways at the exterior of the hopper; and a cut-off gate might be arranged to slide in ways parallel therewith inside the hopper, separated only by the thickness of its wall.

I claim—

1. In combination with the pulleys on the ends of the rolls, one of which latter is driven, a spring-pressed movable carrier located at a distance therefrom and bearing a tightening and transmitting pulley or pulleys, and belts passing from the pulleys on the rolls to the pulley or pulleys on the carrier.

2. In combination with differentially-moving rolls, one of which is driven, a large pulley on the shaft of one, a small pulley on the shaft of the other, a movable spring-pressed yoke, carrying on one spindle a large and a small pulley, a belt connecting the large pulley on the one roll with the small pulley on the yoke, and a belt connecting the small pulley on the other roll with the large pulley on the yoke.

3. In combination with the rolls and their pulleys, the yoke carrying converse pulleys, the spring for pressing it down, and the screw for adjusting the stress of said spring.

4. In combination with the rolls and their end pulleys, the yoke pivoted to the mill-frame and carrying converse pulleys, the spring pressing down the free end of said yoke, and the screw for increasing or decreasing the stress of said spring.

5. In combination with the spring-pressed sliding bearings of the movable roll and the fixed bearings of the stationary roll, a cam between the movable and fixed bearings at each end, against which the former are held by their spring or springs, a lever fast to each cam, and a rack upon the frame, into which said lever is latched by suitable means.

6. In combination with the movable and stationary rolls, a dome-shaped casing covering them, cams against which the movable bearings are pressed by springs, and pivoted substantially concentric with said casing, racks formed upon and partaking of the outline of the metal side frames of the casing, levers fixed to the cams, and means for latching the levers into said racks.

7. The combination of the stationary and movable spring-pressed roll, cams or eccentrics pivoted between the fixed and movable bearings at each end of the rolls, levers fast to said cams, and similarly graduated or numbered racks, into which said levers are latched by suitable means, whereby the adjustment at each end may be visually indicated to insure parallelism of the rolls.

8. In combination with the feed-gate of the hopper, devices at each end to independently open it at such end, and an identically-graduated scale or indicator for each of said devices to insure the gate being instantly and accurately returned to its proper adjustment.

9. In combination with a sliding hopper-gate, elbow-levers, to which it is hung at each end, a segmentally-slotted plate fast to the body of the hopper, underlying the long arm of each lever, a set or clamp screw taking from said arm into the slot in the plate to lock the arm in any determined adjustment, and a scale upon each plate, similarly graduated, to indicate the adjustment at each end.

10. In combination with the sliding feed-gate, the elbow-levers pivoted to the hopper and having their long arms terminating in pointers, the segmentally-slotted plates upon the hopper-casing, the clamp-screws taking from the lever-arms into said slots, and the graduated scales underlying the pointers in the path in which the latter move.

11. In combination with the hopper, a pivoted cut-off plate and a protecting-shield between said hopper and an edge of the cut-off plate.

12. In combination with the hopper and its adjustable gate, a cut-off plate suspended near the bottom of the hopper, above the feed-roll, a shield overlying the rear of said plate, and means whereby the plate may be moved against the side of the hopper above the feed-orifice.

13. In combination with the hopper and its adjustable gate, a cut-off plate suspended near the bottom of the hopper by means of arms depending from overhead pivots, a lever rigid with one of said pivots, and its arm, whereby the cut-off may be swung against the side of the hopper or its gate to close the exit-orifice, and a shield or apron at the other side of the hopper and resting against the rear edge of the cut-off plate.

14. The combination of the hopper, its adjustable gate, the cut-off plate K, arms $k$, pivots $k'$, lever $k^2$, and its rack $k^3$, and the shield, apron, or bridge $k^4$, substantially as described.

Witnesses:     JOHN STEVENS.
ROBT. SHIELLS,
ALEX. McNAUGHTON.